(12) United States Patent
Wen et al.

(10) Patent No.: US 8,512,832 B2
(45) Date of Patent: Aug. 20, 2013

(54) HEAT-CURABLE COATING FOR STRENGTHENING GLASS

(75) Inventors: Mei Wen, Malvern, PA (US); Gary Stephen Silverman, Chadds Ford, PA (US)

(73) Assignee: Sabmiller International BV, Rotterdam (NL)

( * ) Notice: Subject to any disclaimer, the term of this patent is extended or adjusted under 35 U.S.C. 154(b) by 278 days.

(21) Appl. No.: 12/918,208

(22) PCT Filed: Feb. 20, 2009

(86) PCT No.: PCT/IB2009/050703
§ 371 (c)(1),
(2), (4) Date: Aug. 18, 2010

(87) PCT Pub. No.: WO2009/104160
PCT Pub. Date: Aug. 27, 2009

(65) Prior Publication Data
US 2011/0003098 A1    Jan. 6, 2011

Related U.S. Application Data

(60) Provisional application No. 61/030,414, filed on Feb. 21, 2008.

(51) Int. Cl.
*B32B 1/02*    (2006.01)

(52) U.S. Cl.
USPC ....... 428/34.7; 428/417; 427/427.4; 524/500; 524/540

(58) Field of Classification Search
USPC ...... 428/34.7, 417; 524/500, 540; 427/427.4
See application file for complete search history.

(56) References Cited

U.S. PATENT DOCUMENTS

| | | | | |
|---|---|---|---|---|
| 3,362,843 A | * | 1/1968 | Smith et al. | 428/34.7 |
| 4,056,208 A | | 11/1977 | Prejean | |
| 7,723,445 B2 | * | 5/2010 | Yamauchi et al. | 525/531 |
| 2008/0199618 A1 | * | 8/2008 | Wen et al. | 427/299 |

FOREIGN PATENT DOCUMENTS

| | | |
|---|---|---|
| EP | 0289325 | 11/1988 |
| WO | WO2006013943 | * 2/2006 |

OTHER PUBLICATIONS

PCT International Search Report and Written Opinion issued for PCT/IB2009/050703 dated May 28, 2009.

* cited by examiner

*Primary Examiner* — Gwendolyn Blackwell
*Assistant Examiner* — Yan Lan
(74) *Attorney, Agent, or Firm* — Shaukat A. Karjeker; Colin P. Cahoon; Carstens & Cahoon, LLP

(57) ABSTRACT

The invention relates to a method of making a coating composition for coating glass. The method includes the steps of combining an epoxy resin component, a methacrylate component, a silane coupling agent, an epoxy curing agent, and an initiator agent.

23 Claims, No Drawings

HEAT-CURABLE COATING FOR STRENGTHENING GLASS

BACKGROUND

1. Field of the Invention

This invention relates to a method of making a composition for coating glass, to a composition for coating glass, to a method of coating glass and to a coated glass item.

2. Description of the Related Art

Prior art coatings known to the applicant include UV-curable acrylate coatings, siloxane coatings, single and multiple polyurethane coatings, epoxy coatings and acrylate coatings. Prior art coatings which have a strengthening effect include polyacrylate coatings as disclosed in U.S. Pat. No. 4,891,241 and siloxane coatings as disclosed in U.S. Pat. No. 6,013,333 and U.S. Pat. No. 5,567,235. The polyacrylate coatings required ultraviolet curing whereas the siloxane coatings were found to be susceptible to a loss of strength in humid environments. The polyurethane coatings of U.S. Pat. No. 4,093,758, U.S. Pat. No. 4,053,076, EP 025992 and U.S. Pat. No. 5,837,795 were used mainly for anti-scattering or anti-shattering coatings for bottles. These coatings were also used as protective coatings to retain the initial strength of the bottle. Anti-caustic and abrasion resistant polymeric coatings for bottles are disclosed in U.S. Pat. No. 4,056,208 and a three layer coating consisting of a silane primer, an epoxy layer and an acrylate layer is disclosed in JP 2002347769 A and JP 2002059932A.

SUMMARY

It is an object of the invention to provide a coating to strengthen glass thereby reducing both the mass of the glass and the cost of the bottle. This process is generally referred to as the "lightweighting" of bottles.

The invention provides a heat-curable one layer epoxy-acrylate coating which results in an outstanding improvement in the strength of glass containers and results in the lightweighting of non-returnable bottles. Prior art coatings known to the applicant include UV-curable acrylate coatings, siloxane coatings, single and multiple polyurethane coatings, epoxy coatings and acrylate coatings. Prior art coatings which have a strengthening effect include polyacrylate coatings as disclosed in U.S. Pat. No. 4,891,241 and siloxane coatings as disclosed in U.S. Pat. No. 6,013,333 and U.S. Pat. No. 5,567, 235. The polyacrylate coatings required ultraviolet curing whereas the siloxane coatings were found to be susceptible to a loss of strength in humid environments. The polyurethane coatings of U.S. Pat. No. 4,093,758, U.S. Pat. No. 4,053,076, EP 025992 and U.S. Pat. No. 5,837,795 were used mainly for anti-scattering or anti-shattering coatings for bottles. These coatings were also used as protective coatings to retain the initial strength of the bottle. Anti-caustic and abrasion resistant polymeric coatings for bottles are disclosed in U.S. Pat. No. 4,056,208 and a three layer coating consisting of a silane primer, an epoxy layer and an acrylate layer is disclosed in JP 2002347769 A and JP 2002059932A.

The coatings of the present invention have a different chemistry and different properties from the coatings and coating systems known in the prior art.

DETAILED DESCRIPTION

According to a first aspect of the invention there is provided a method of making a coating composition for coating glass, the method including the steps of combining an epoxy resin component;
a methacrylate component;
a silane coupling agent;
an epoxy curing agent; and
an initiator agent.

The method may include combining, one or both of an allyl ether component and a metal drier component with the epoxy resin component, the methacrylate component, the silane adhesion promoter, the epoxy curing agent and the initiator agent to produce the composition.

The epoxy resin component may be a resin based on diglycidyl ethers of bisphenol A. A preferred resin of this type is EPON Resin 828™. This material is an undiluted clear difunctional bisphenol A and epichlorohydrin derived liquid epoxy resin. The EPON range of products is manufactured by Hexion Specialty Chemicals. Other resins which can be used include EPON Resin 826™, EPON Resin 830™, DER 331™ DER 317™, DER 330™, DER 362™, DER 364™, DER 383™ and DER 337™ which have different molecular weights and viscosities. The DER range of products is manufactured by the Dow Chemical Company.

The methacrylate component may comprise a mixture of methacrylate oligomers, difunctional methacrylate monomers and trifunctional methacrylate monomers. The methacrylate oligomers may be epoxy methacrylate oligomers derived from bisphenol A or urethane oligomers. The difunctional methacrylate monomer may, for example, be ethoxylated bisphenol A dimethyacrylate and the trifunctional methacrylate monomer may, for example, be trimethylolpropane trimethacrylate. Other difunctional methacrylates which can be used in the method of the invention include ethoxylated (4) bisphenol A dimethyacrylate (CD540™), ethoxylated (8) bisphenol A dimethyacrylate (CD542™), ethoxylated (2) bisphenol A dimethyacrylate (SR348™), ethoxylated bisphenol A dimethyacrylate (SR150™). The CD and SR range of products is manufactured by the Sartomer Company.

The silane coupling agent may be applied by using a pre-hydrolysed solution of an organo-functional silane or a mixture of organo-functional silanes or a pre-hydrolysed solution of a mixture of organo-functional silanes and non-functional dipodal silanes. The organo-functional silanes should contain organo-functional groups that can react with epoxy, epoxy curing agent, or methacrylate. Preferred organo-functional silanes are γ-methacryloxypropyltrimethoxysilane and (3,4-epoxycyclohexyl)ethyl trimethoxysilane. Other organo-functional silanes that can be used include γ-acryloxypropyltrimethoxysilane, γ-acryloxypropyltriethoxysilane, γ-methacryloxypropyltriethoxysilane, γ-aminopropyl trimethoxysilane, γ-aminopropyl triethoxysilane, N-(2-aminoethyl)-3-aminopropyltrimethoxysilane, N-(2-aminoethyl)-3-aminopropyltriethoxysilane, (3-glycidoxypropyl)trimethoxysilane and (3-glycidoxypropyl)triethoxysilane. A preferred non-functional dipodal silane is bis(triethoxysilyl)ethane. Another dipodal silane that can be used is bis(trimethoxysilyl)ethane. One example of a silane solution is a pre-hydrolysed solution of (3,4-epoxycyclohexyl)ethyl trimethoxysilane and bis(triethoxysilyl)ethane. The pre-hydrolysis may be carried out in an alcoholic solvent such as isopropanol with addition of water and an acid catalyst such as acetic acid. The concentration of the silanes in the pre-hydrolysis solution will typically be less than about 50%. In the total composition, the concentration of (3,4-epoxycyclohexyl)ethyl trimethoxysilane may be between about 0 and 10% preferably about 0.01 to 6% and the concentration of bis(triethoxysilyl)ethane may be between about 0 and 10% and preferably about 0.01 to 6%.

The epoxy curing agent may be an amine curing agent. It may, for example, be a modified cycloaliphatic amine such as Ancamine 2280™. Other amine curing agents which may be used include Ancamine 2264™, Ancamine 2196™, Ancamine 2280™, Ancamine 2320™ and diaminodiphenyl sulphone. These cycloaliphatic amines have different amine values, viscosities and physical properties. The Ancamine range of products is supplied by Air Products.

The initiator agent is used to generate free radicals for polymerisation of the methacrylates. It may be a peroxide. The peroxide may, in particular, be a peroxyester or a ketone peroxide. Preferred peroxyesters, include t-butylperoxybenzoate, methyl ethyl ketone peroxide, 1,1-di(t-butylperoxy)-3,5,5-trimethylcyclohexane, 1,1-di(t-amylperoxy)cyclohexane, t-butylperoxy-2-ethylhexanoate and t-amylperoctoate.

The metal drier is used as catalyst for drying at the film surface. It may be a primary metal drier such as a cobalt compound. The primary drier catalyses hydroperoxide decomposition formed by the reaction of oxygen in the air with the resin. The cobalt compound may, in particular, be cobalt bis(2-ethylhexanoate). This cobalt salt is also referred to as cobalt octoate. The cobalt octoate is a primary metal drier in the composition of the invention. The metal drier may, instead, be a cobalt naphtheneate or a manganese soap. Secondary driers such as calcium octoate and/or zirconium octoate may be added together with the primary drier to modify the polymerisation process.

The allyl ether helps free-radical curing under air. It reacts with oxygen and free radicals to generate hydroperoxide, which reacts with the primary metal driers to generate more free radicals for curing. The allyl ether may be an aliphatic allyl oligomer, for example CN9010™ manufactured by the Sartomer Company. The addition of allyl ether and metal driers allows curing to a tacky-free, and non-blushing surface under air.

The epoxy resin may comprise between about 1 and 80% by weight of the total composition, preferably between about 1 and 50%, and more preferably between about 10 and 25%.

The methacrylate component may comprise between about 5 and 90% by weight of the total composition, preferably between about 20 and 50%. The methacrylate component may comprise between about 10 and 90% and preferably between about 20 and 60% of the oligomer, between about 5 and 90% and preferably between about 10 and 50% of the difunctional methacrylate monomer and between about 0-50% and preferably about 5 and 40% of the trifunctional methacrylate monomer The pre-hydrolysed silane solution, may comprise between about 0 and 50% and preferably between about 10 and 40% of the total composition. This will allow the composition of the organo-functional silanes in the total composition to be between about 0.01 and 10% preferably between about 0.01 to 6%, and the concentration of non-functional bipodal silanes to be between about 0 and 10% and preferably between about 0.01 to 6%.

The amount of the epoxy curing agent used in the composition is determined by the molar ratio of epoxide to amine hydrogen. This ratio may be between about 0.9 and 1.2 and is preferably between about 0.95 and 1.1.

The initiator agent may comprise between about 0.5 and 8% of the total composition and preferably between about 0.1 and 4%.

The amount of the metal drier component may be selected so that the solid resin contains between about 0.0005 and 0.1% of metal (by weight) in dried coating and preferably between about 0.001 and 0.008% of metal in dried coating.

The allyl ether may comprise between about 0.5 and 15% of the total composition and preferably between about 1 and 10%.

According to a second aspect of the invention there is provided a coating composition for coating glass, the composition comprising
an epoxy resin component;
a methacrylate component;
a silane coupling agent;
an epoxy curing agent; and
an initiator agent.

The epoxy resin component, the methacrylate component, the silane coupling agent, the epoxy curing agent and the initiator agent may be as hereinbefore described.

The composition may, in addition, include one or both of an allyl ether component and a metal drier component as hereinbefore described.

According to a third aspect of the invention, there is provided a method of coating a glass surface, the method including the step of applying, to the surface, a composition which includes
an epoxy resin component;
a methacrylate component;
a silane coupling agent;
an epoxy curing agent; and
an initiator agent.

The composition may, further, include one or both of an allyl ether component and a metal drier component.

The epoxy resin component, the methacrylate component, the silane coupling agent, the epoxy curing agent and the initiator agent may be as hereinbefore described.

The allyl ether component and the metal drier component may be as hereinbefore described.

The surface may be the surface of a glass bottle. In particular, the surface may be the surface of a beverage bottle such as a beer bottle.

The coating process of the invention will typically be implemented into a bottle production line after annealing in the LEHR and before the cold-end-coating (CEC) is applied. Coating solution will be sprayed onto bottles row by row and the sprayed coatings will be cured thermally online To mimic the bottle surface condition, as-received bottles that were CEC coated needed to be heat-treated to remove CEC before coating application and test. Before spraying, the bottles were preheated to mimic the temperature condition of bottles online towards the end of LEHR and before CEC application process. Then spraying the bottles with the coating composition was carried out. The method included reheating the bottles after the spraying step to cure and solidify the coating. The initial heating step may be at a temperature of about 450° C. for about two hours. The second heating step may be between about 200 and 210° C. to reach equilibrium temperature and the third heating step may be between about 180 and 190° C. for about 20 to 30 minutes to obtain a tacky-free surface.

The invention extends to a glass item which has been coated with a coating composition as hereinbefore described.

The glass item may be a beverage bottle such as a beer bottle.

The invention thus provides a highly cross-linked, interpenetrating epoxy-methacrylate network which can be applied to strengthen glass bottles. The epoxy-methacrylate interpenetrating network allows thermal curing of methacrylate under air by adding an epoxy-amine reacting system. This eliminates the extra cost associated with the use of UV equipment and avoids the difficulty of uniform UV irradiation on a multiple bottle line. Typically, metal driers are added to the methacrylates to achieve a tacky-free surface. These films tend to have wrinkling defects due to non-uniform curing of coatings across the film. However, by adding an epoxy network into the coating more uniform curing of coatings results and the film obtained is uniform. The addition of metal driers and allyl ethers to the coating system speeds up the polymerisation of the methacrylates so that the interpenetrating network of methacrylates and epoxy resin can be built at about a similar rate. Although the coating will cure in the absence of metal driers and allyl ethers, the films tend to be tacky and the conversion of methacrylates is low. By adding metal driers and allyl ethers, the rate of curing of the methacrylates can be increased so that competing interpenetrating networks can be formed.

In a typical procedure, coating solutions were prepared by mixing EPON 828 resin with the methacrylate solution. The methacrylate solution consisted of 42% bisphenol A epoxymethacrylate CN151 (Sartomer, Exton, Pa.), 33.6% ethoxlated bisphenol A dimethyacrylate SR541 (Sartomer) and 24% trimethylol propane trimethacrylate SR350 (Sartomer). The solution was heated at 70° C. for 15 minutes in order to obtain uniform mixing. The allyl ether CN9101 was preheated at 60° C. for five minutes and then added to the pre-mixture and shaken. Pre-hydrolysed silane solution was prepared by mixing the silane coupling agents γ-methacryloxypropyltrimethoxysilane (MPTMO) or (3,4-epoxycyclohexyl)ethyltrimethoxysilane (CETMO) with the silane crosslinker bis(triethoxysilyl)ethane (BESE) in isopropanol and a small amount of acidic water (pH=4) for catalysis. The silane solution was aged for four hours to promote pre-hydrolysis. Finally, Ancamine 2280, cobalt octoate (6% in mineral oil), the pre-hydrolysed silane solution and Luperox P were added to the mixture to produce a homogeneous coating solution before the coating application.

The invention is now described, by way of example, with reference to the following four examples.

EXAMPLE 1

Formulations 1 and 2 were prepared according to Tables 1-3. CEC-removed bottles were preheated to 200° C. and then brought to a turning table one at a time for spraying. The bottle temperature at which spraying took place was about 180° C. The bottles were then transferred to a curing oven and the coatings were cured at 180° C. for 20 min. The cured coating was tacky-free and non-blushing. The bottles were then tested for burst pressure. The results are listed in Table 4. Formulation 1 had an average of 0.5 g of cured coating per bottle. Formulation 1 coated bottles showed a 32% increase of the burst pressure at a probability of failure F=0.8% (low-end burst pressure) and a 28% increase of the average burst pressure compared to the CEC-removed bottles. The burst pressure of CEC-removed bottles was determined based on 50 bottles. The Formulation 2 coating had an average of 0.6 g per bottle. Formulation 2 coated bottles showed a 26% increase of the low end burst pressure and a 31% increase of the average burst pressure. Both formulations resulted in an effective improvement of the bottle strength at the low end as well as a significant increase of the average strength of uncoated bottles (P values less than 0.05).

EXAMPLE 2

Formulations 3 and 4 were prepared according to Tables 1-3. CEC-removed bottles were preheated to 210° C. and then transferred to a turning table one at a time for spraying. The bottle temperature at which spraying took place was about 190° C. The bottles were then transferred to a curing oven and the coatings were cured at 190° C. for 30 min. The cured coating was tacky-free and non-blushing. The bottles were then tested for burst pressure (Table 4). Formulation 3 coated bottles showed a 116% increase of the burst pressure at probability of failure F=0.8% (low-end burst pressure) and a 33% increase of the average burst pressure compared to the CEC-removed bottles. The Formulation 4 coated bottles showed a 13% increase of the burst pressure at the low end and a 28% increase of the average burst pressure. Formulations 3 and 4 coated bottles had a coating weight of 0.45 g and 0.35 g respectively. Both formulations resulted in an effective improvement of the bottle strength at the low end as well as a significant increase of the average strength of uncoated bottles (P value less than 0.05).

EXAMPLE 3

Formulation 5 was prepared according to Tables 1-3. Here the silane solution was prepared with CETMO and BESE instead of MPTMO and BESE. Twelve CEC-removed bottles were preheated to 210° C. and then brought to a turning table one at a time for spraying. The bottle temperature at which spraying took place was about 190° C. The bottles were then transferred to a curing oven and the coatings were cured at 190° C. The cured coating was tacky-free and non-blushing. The bottles were then tested for burst pressure (Table 4). Formulation 5 coated bottles showed a 122% increase of the burst pressure at probability of failure F=0.8% and a 34% increase of the average burst pressure compared to the CEC-removed bottles. Formulation 5 coated bottles had a coating weight of 0.27 g per bottle. The formulation resulted in an effective improvement of the bottle strength at the low end as well as significant increase of the average strength of uncoated bottles (P value less than 0.05).

TABLE 1

Coating formulations listed as parts by weight. Details of the MA (methacrylate) solution and silane solutions are shown in Tables 2 and 3.

| Formulations | Epon 828 | MA solution | Ancamine 2280 | Silane solution 1 or 2 | Luperox P | CN9101 | 6% Cobalt octoate |
|---|---|---|---|---|---|---|---|
| 1 | 18 | 43 | 10 | 18* | 0.9 | 9 | 0.45 |
| 2 | 19 | 45 | 11 | 19* | 0.9 | 5 | 0.24 |
| 3 | 17 | 41 | 10 | 20* | 3.3 | 8 | 0.35 |
| 4 | 19 | 45 | 11 | 20* | 3.6 | 2 | 0.10 |
| 5 | 17 | 41 | 10 | 20** | 3.3 | 8 | 0.35 |

*silane solution 1, and
**silane solution 2.
Cobalt octoate was used as 6% solution in mineral oil.

TABLE 2

Formulation of the MA solution mixture

| Component | Parts by weight |
|---|---|
| CN 151 (bisphenol A epoxy methacrylate) | 42.02 |
| SR 541 (ethoxylated bisphenol A dimethacrylate) | 33.61 |
| SR 350 (trimethylolpropane trimethacrylate) | 24.37 |

TABLE 3

Formulations of silane solution 1 and silane solution 2 listed as parts by weight.

| Component | Silane Solution 1 | Silane Solution 2 |
|---|---|---|
| MPTMO (γ-methacryloxypropyltrimethoxysilane) | 15 | 0 |
| CETMO (4,3-epoxycyclohexyl)ethyltrimethoxysilane | 0 | 15 |
| BESE (bis(triethoxysilyl)ethane) | 15 | 15 |
| isopropyl alcohol | 65 | 65 |
| $H_2O$ (adjusted by acetic acid to pH = 4) | 5 | 5 |

TABLE 4

Bottle strengthening data

| Coating | No of Bottles | Average coating weight, g | No. of unbroken bottles | P60 at F = 0.8%, bar | Increase of P60 at F = 0.8% | Average P60, bar | Standard deviation of P60, bar | Increase of average P60 | P-value |
|---|---|---|---|---|---|---|---|---|---|
| CEC-mvd | 50 | N/A | 0 | 13.7 | N/A | 31.96 | 7.14 | N/A | N/A |
| 1 | 12 | 0.48 | 4 | 18.1 | 32% | 40.96 | 7.74 | 28% | 0.0003 |
| 2 | 12 | 0.55 | 3 | 17.2 | 26% | 41.88 | 7.92 | 31% | <0.0001 |
| 3 | 12 | 0.45 | 3 | 29.6 | 116% | 42.45 | 3.9 | 33% | <0.0001 |
| 4 | 12 | 0.35 | 5 | 15.6 | 13% | 41.03 | 8.06 | 28% | 0.0003 |
| 5 | 12 | 0.27 | 1 | 30.5 | 122% | 42.71 | 3.61 | 34% | <0.0001 |

TABLE 5

Label adhesion test of Formulation 3 coatings

| Bottle condition | 24 hr at 40° C.-pull test | 24 hr in ice-pull test |
|---|---|---|
| CEC-removed | Pass | Pass |
| Formulation 3 | Pass | Pass |

Testing

Burst Pressure Test

Coated bottles were tested with an AGR ramp pressure tester to determine burst pressure. The test was carried out according to ASTM C-147 Method B. Application of internal pressure increasing at a predetermined rate and the burst pressure corrected to 1 minute load was reported (P60). In some formulations, coated bottles did not break even after three times of burst pressure test due to limit of the maximum pressure available. In these cases, the highest burst pressure applied was used for data analysis for that bottle. In each formulation, 12 bottles were tested. The burst pressure of 50 CEC-removed bottles was used as controls.

The burst pressure (P60, also noted as σ below) data were analyzed with a Weibull function, where the probability of failure F is a function of Weibull shape factor m and Weibull scale $\sigma_0$.

$$F=1-\exp[-(\sigma/\sigma_0)^m]$$

EXAMPLE 4

Formula 3 coated bottles were tested for label adhesion. The adhesive OPTAL 10-7500M (from Henkel) was a non-casein glue that had similar structure and property to a casein-based glue. The adhesive was applied to a grooved plate, which had rows of grooves of 1 mm wide×1 mm deep spaced by 2 mm wide solid area. A #3 draw-down bar was used to meter the adhesive on the grooved plate. The metered adhesive was applied to a beer label and the label was applied to the coated bottle surface. Two bottles were used for both CEC-removed and coated bottles in both heat test and ice-proof tests. In the heat test, bottles were placed in a 40° C. oven for 24 hours. After the heat treatment, the labels on both types of bottles adhered well (Table 5). In the ice-proof test, bottles were immersed in an ice-water tank and rotated at different immersion time (e.g., t=2 hr, 6 hr, and 24 hr). After 24 hr, the labels on both types of bottles still adhered well to the coated bottle surface (Table 5) showing that the Formulation 3 coating resulted in good label adhesion.

In a linear form, the equation becomes $$\ln[\ln(1/(1-F))]=m \ln \sigma - m \ln \sigma_0$$

The data obtained were fitted according to this relationship to obtain m and $\sigma_0$. From the fitting, the burst pressure of bottles at 0.8% probability of failure (F=0.8%) was calculated.

$$\sigma_{F=0.8\%}=0.00803^{1/m}\sigma_0$$

This burst pressure represented the strength of weak bottles and is used as a major parameter to determine how effective a coating can strengthen bottles from the low end of their strength distribution.

P-value analysis was also implemented to determine the strengthening effect of coatings based on the average burst pressure. The protocol used was a t-student test that determined the difference between the means of two samples: coated and CEC-removed bottles. Typically, when P value is less than 0.05, the strengthening was considered significant.

The invention provides highly cross-linked polymeric coatings that present substantial strengthening of glass containers. The coatings consist largely of reactive methacrylic monomers and oligomers, peroxides, epoxy resins and amines which form interpenetrating methacrylate and epoxy networks upon curing. The addition of methallyl ether and metal driers allowed curing to a tacky-free, and non-blushing surface under air. The silane coupling agents and cross-linkers resulted in good adhesion of the coatings to glass. It was found that the coatings could strengthen glass containers by up to 122% at the low end of burst pressure distribution and to result in good label adhesion. The coatings can be used to lightweight glass containers.

The invention claimed is:

1. A lightweighted glass container consisting essentially of a single coating providing an increase in low end burst pressure of 26% and up to 122%, as compared to an uncoated container without a cold-end coating, the coating derived from a coating mixture comprising: a methacrylate component and an epoxy resin component, a silane component comprising a pre-hydrolysed silane solution, a silane crosslinker, an epoxy curing agent, an initiator agent, and at least one of: an allyl ether component and a metal drier component;
    wherein the lightweighted glass container is produced by a method comprising the steps of:
        coating an uncoated glass container, having a surface as exiting from an LEHR, on the continuous production line with the coating mixture to provide a single-layer coating on the glass container; and
        heating the single-layer coated glass container to about 450° C. to thermally cure the coating on the container, without requiring UV light.

2. The glass container as claimed in claim 1, in which the epoxy resin component is derived from diglycidyl ethers of bisphenol A.

3. The glass container as claimed in claim 2, in which the epoxy resin component is derived from difunctional bisphenol A and epichlorohydrin.

4. The glass container as claimed in claim 1, in which the methacrylate component is selected from one or more methacrylate oligomers, one or more difunctional methacrylate monomers, one or more trifunctional methacrylate monomers and mixtures thereof.

5. The glass container as claimed in claim 4, in which the methacrylate oligomers are selected from epoxy methacrylate oligomers derived from bisphenol A or urethane oligomers, the difunctional methacrylate monomers are selected from ethoxylated bisphenol A dimethyacrylates and the trifunctional methacrylate monomers are selected from trimethylolpropane trimethacrylates and mixtures of any two or more thereof.

6. The glass container as claimed in claim 5, in which the difunctional methacrylate monomers are selected from ethoxylated (4) bisphenol A dimethyacrylate, ethoxylated (8) bisphenol A dimethyacrylate, ethoxylated (2) bisphenol A dimethyacrylate, ethoxylated bisphenol A dimethyacrylate and mixtures of any two or more thereof.

7. The glass container as claimed in claim 1, in which the silane component is a pre-hydrolysed solution produced by pre-hydrolysing a solution selected from solutions of organo-functional silanes, solutions of mixtures of organo-functional silanes, solutions of non-functional dipodal silanes, solutions of mixtures of non-functional dipodal silanes and combinations of any two or more thereof.

8. The glass container as claimed in claim 7, in which the organo-functional silane is selected from γ-methacryloxypropyltrimethoxysilane, (3,4-epoxycyclohexyl)ethyl trimethoxysilane, γ-acryloxypropyltrimethoxysilane, γ-acryloxypropyltriethoxysilane, γ-methacryloxypropyltriethoxysilane, γ-aminopropyltrimethoxysilane, γ-aminopropyltriethoxysilane, N-(2-aminoethyl)-3-aminopropyltrimethoxysilane, N-(2-aminoethyl)-3-aminopropyltriethoxysilane, (3-glycidoxypropyl)trimethoxysilane, (3-glycidoxypropyl)triethoxysilane and mixtures of any two or more thereof.

9. The glass container as claimed in claim 7, in which the non-functional dipodal silane is bis(triethoxysilyl)ethane.

10. The glass container as claimed in claim 7, in which the concentration of the silane in the pre-hydrolysis solution is less than 50% (w/w).

11. The glass container as claimed in claim 1, in which the epoxy curing agent is an amine curing agent.

12. The glass container as claimed in claim 1, in which the initiator agent is a peroxide.

13. The glass container as claimed in claim 12, in which the peroxide is selected from t-butylperoxybenzoate, methyl ethyl ketone peroxide, 1,1-di(t-butylperoxy)-3,5,5-trimethylcyclohexane, 1,1-di(t-amylperoxy)cyclohexane, t-butylperoxy-2-ethylhexanoate and t-amylperoctoate.

14. The glass container as claimed in claim 1, in which the metal drier is selected from cobalt, manganese and zirconium compounds.

15. The glass container as claimed in claim 14, in which the metal drier is selected from cobalt bis(2-ethylhexanoate), cobalt naphtheneate, manganese soaps, calcium octoate, zirconium octoate and mixtures of any two or more thereof.

16. The glass container as claimed in claim 1, in which the epoxy resin comprises between 1 and 80% by weight of the total composition.

17. The glass container as claimed in claim 1, in which the methacrylate component comprises between 5 and 90% by weight of the total composition.

18. The glass container as claimed in claim 1, in which the pre-hydrolysed silane solution, comprises between 0 and 50% of the total composition.

19. The glass container as claimed in claim 1, in which the initiator agent comprises between 0.5 and 8% of the total composition.

20. The glass container of claim 1, wherein the step of heating includes heating to about 450° C. for about 2 hours.

21. The glass container of claim 1, wherein the step of heating comprises heating in three stages.

22. The glass container of claim 1, wherein the step of heating includes heating to about 200 to about 210° C.

23. The glass container of claim 1, wherein the step of heating includes heating to about 180 to about 190° C. for about 20 to about 30 minutes.

* * * * *